(12) United States Patent
King et al.

(10) Patent No.: US 9,732,192 B1
(45) Date of Patent: Aug. 15, 2017

(54) FLAME-RETARDANT, CROSS-LINKED POLYHYDROXYALKANOATE MATERIALS

(71) Applicant: International Business Machines Corporation, Armonk, NY (US)

(72) Inventors: Scott B. King, Rohcester, MN (US); Brandon M. Kobilka, Tucson, AZ (US); Joseph Kuczynski, North Port, FL (US); Jason T. Wertz, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/078,545

(22) Filed: Mar. 23, 2016

(51) Int. Cl.
| | |
|---|---|
| *C08G 79/04* | (2006.01) |
| *C08G 79/02* | (2016.01) |
| *C08L 55/02* | (2006.01) |
| *C08L 67/00* | (2006.01) |
| *C08L 67/04* | (2006.01) |
| *C08L 69/00* | (2006.01) |
| *C08L 71/00* | (2006.01) |
| *C08L 75/04* | (2006.01) |
| *C08L 85/02* | (2006.01) |
| *C08G 63/692* | (2006.01) |
| *C12P 7/62* | (2006.01) |

(52) U.S. Cl.
CPC ............ *C08G 79/04* (2013.01); *C08L 55/02* (2013.01); *C08L 67/00* (2013.01); *C08L 67/04* (2013.01); *C08L 69/00* (2013.01); *C08L 71/00* (2013.01); *C08L 75/04* (2013.01); *C08L 85/02* (2013.01)

(58) Field of Classification Search
CPC .. C08G 63/692; C08G 79/04; C08G 2230/00; C08L 67/00; C12P 7/62
USPC ........................................ 525/190, 450, 451
See application file for complete search history.

(56) References Cited

U.S. PATENT DOCUMENTS

| | | | |
|---|---|---|---|
| 5,395,919 A | 3/1995 | Lee et al. | |
| 6,071,998 A | 6/2000 | Muller et al. | |
| 7,557,152 B2 | 7/2009 | Kanno et al. | |
| 7,968,657 B2 | 6/2011 | Avakian | |
| 8,796,363 B2 | 8/2014 | Harada et al. | |
| 2006/0246291 A1* | 11/2006 | Kunz | B05D 5/12 428/411.1 |
| 2011/0251349 A1* | 10/2011 | Padwa | C08G 63/912 525/190 |
| 2014/0000751 A1* | 1/2014 | Kagumba | C08G 63/916 139/420 R |
| 2014/0235771 A1 | 8/2014 | Suwa et al. | |
| 2014/0249255 A1 | 9/2014 | Harada et al. | |
| 2015/0354311 A1 | 12/2015 | Okura et al. | |

FOREIGN PATENT DOCUMENTS

| | | | |
|---|---|---|---|
| CN | 1952040 A | 4/2007 | |
| CN | 101838538 B | 7/2012 | |
| CN | 102558698 B | 12/2014 | |
| CN | 104513426 A | 4/2015 | |
| CN | 104592475 A | 5/2015 | |
| JP | 58183729 A | 10/1983 | |
| JP | H01287117 A | 11/1989 | |
| JP | H00440388 B2 | 7/1992 | |
| JP | 2010006944 A | 1/2010 | |
| JP | 2010031230 A | 2/2010 | |
| TW | I259188 B | 8/2006 | |

OTHER PUBLICATIONS

Gagnon, et al., Chemical Modification of Bacterial Elastomers: 1. Peroxide Crosslinking, Polymer, vol. 35, Issue 20, Sep. 1994, (Abstract Only) viewed Feb. 10, 2016 http://www.sciencedirect.com/science/article/pii/0032386194900930, 2 pp.

Gagnon, et al., Chemical Modification of Bacterial Elastomers: 2. Sulfur Vulcanization, Polymer, vol. 35, Issue 20, Sep. 1994, (Abstract Only) viewed Feb. 10, 2016 http://www.sciencedirect.com/science/article/pii/00325386194900949, 2 pp.

Gomez, et al., "Making Green Polymers Even Greener: Towards Sustainable Production of Polyhydroxyalkanoates from Agroindustrial By-Products", Intech, Advances in Applied Biotechnology, Jan. 2012, 23 pp.

Biotechnology Forums, Bioplastics: Microbial Production of Polyhydroxyalkanoates (PHA's), viewed Feb. 10, 2016 http://www.biotechnologyforums.com/thread-2280.html, 6 pp.

Eroglu, et al., "Hydroxylation of Pendant Vinyl Groups of Poly(3-hydroxy Undec-10-enoate) in High Yield", Journal of Applied Polymer Science, vol. 97, 2005, 8 pp.

* cited by examiner

*Primary Examiner* — Fred M Teskin

(74) *Attorney, Agent, or Firm* — Patterson+Sheridan, LLP

(57) ABSTRACT

In an example, a flame-retardant, cross-linked polyhydroxyalkanoate (PHA) material includes a first PHA material that is cross-linked to a second PHA material via a phosphorus-based cross-linker.

19 Claims, 2 Drawing Sheets

FLAME-RETARDANT, CROSS-LINKED POLYHYDROXYALKANOATE MATERIALS

I. FIELD OF THE DISCLOSURE

The present disclosure relates generally to flame-retardant, cross-linked polyhydroxyalkanoate (PHA) materials.

II. BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

III. SUMMARY OF THE DISCLOSURE

According to an embodiment, a process includes forming a mixture that includes a biorenewable vinyl-terminated fatty acid and at least one aliphatic fatty acid. The process also includes forming a polyhydroxyalkanoate (PHA) material having a vinyl-terminated side-chain from the mixture via a bacterial fermentation process. The process further includes converting a vinyl group of the vinyl-terminated side-chain to a hydroxyl group, and chemically reacting the hydroxyl group with a phosphorus-based cross-linker to form a flame-retardant, cross-linked PHA material.

According to another embodiment, a flame-retardant, cross-linked PHA material is disclosed that is formed by a process that includes forming a mixture that includes a biorenewable vinyl-terminated fatty acid and at least one aliphatic fatty acid. The process also includes forming a PHA material having a vinyl-terminated side-chain from the mixture via a bacterial fermentation process. The process further includes converting a vinyl group of the vinyl-terminated side-chain to a hydroxyl group, and chemically reacting the hydroxyl group with a phosphorus-based cross-linker to form a flame-retardant, cross-linked PHA material.

According to another embodiment, a flame-retardant, cross-linked PHA material is disclosed. The flame-retardant, cross-linked PHA material includes a first PHA material that is cross-linked to a second PHA material via a phosphorus-based cross-linker.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 1:
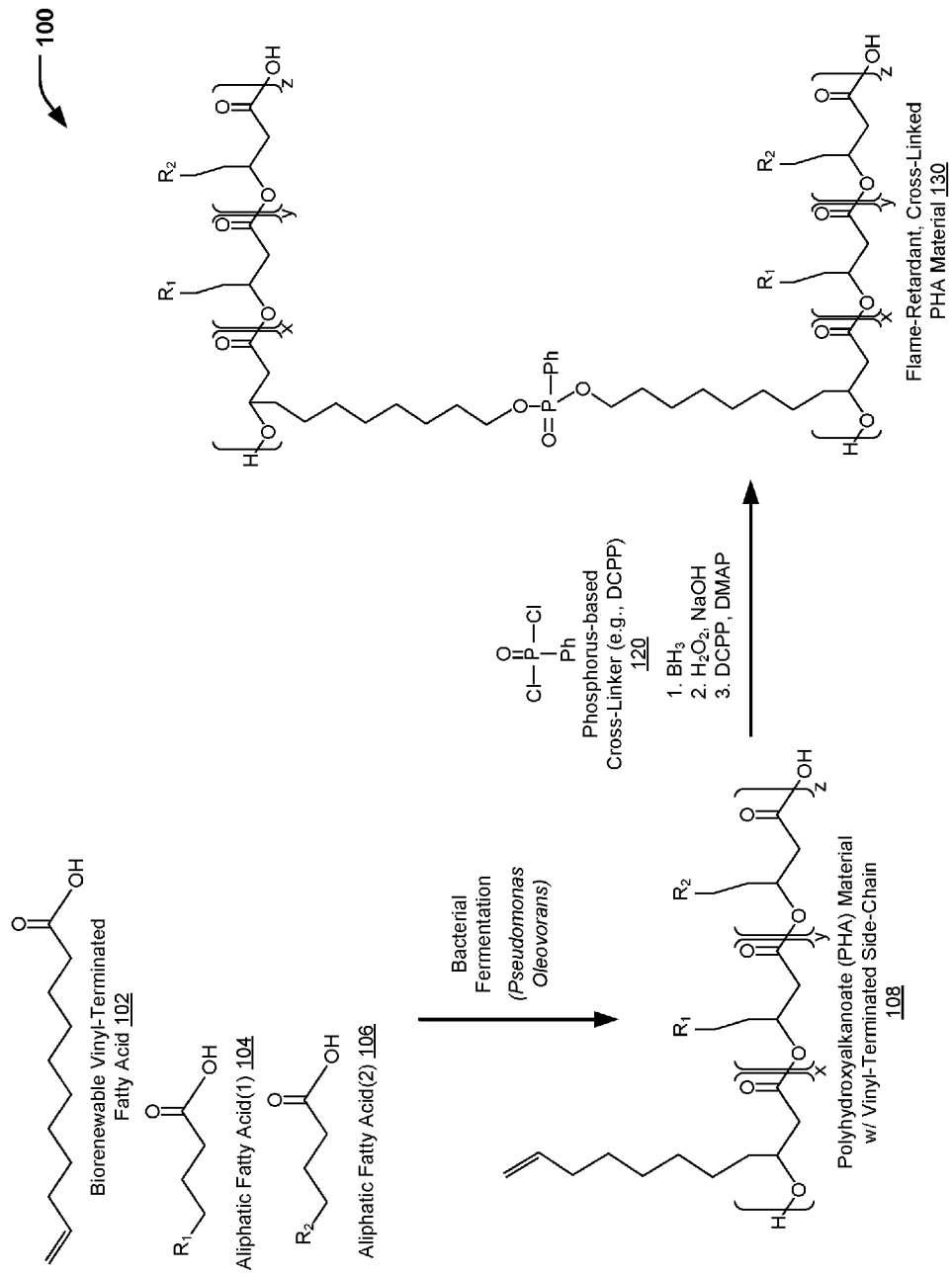
Figure 2:
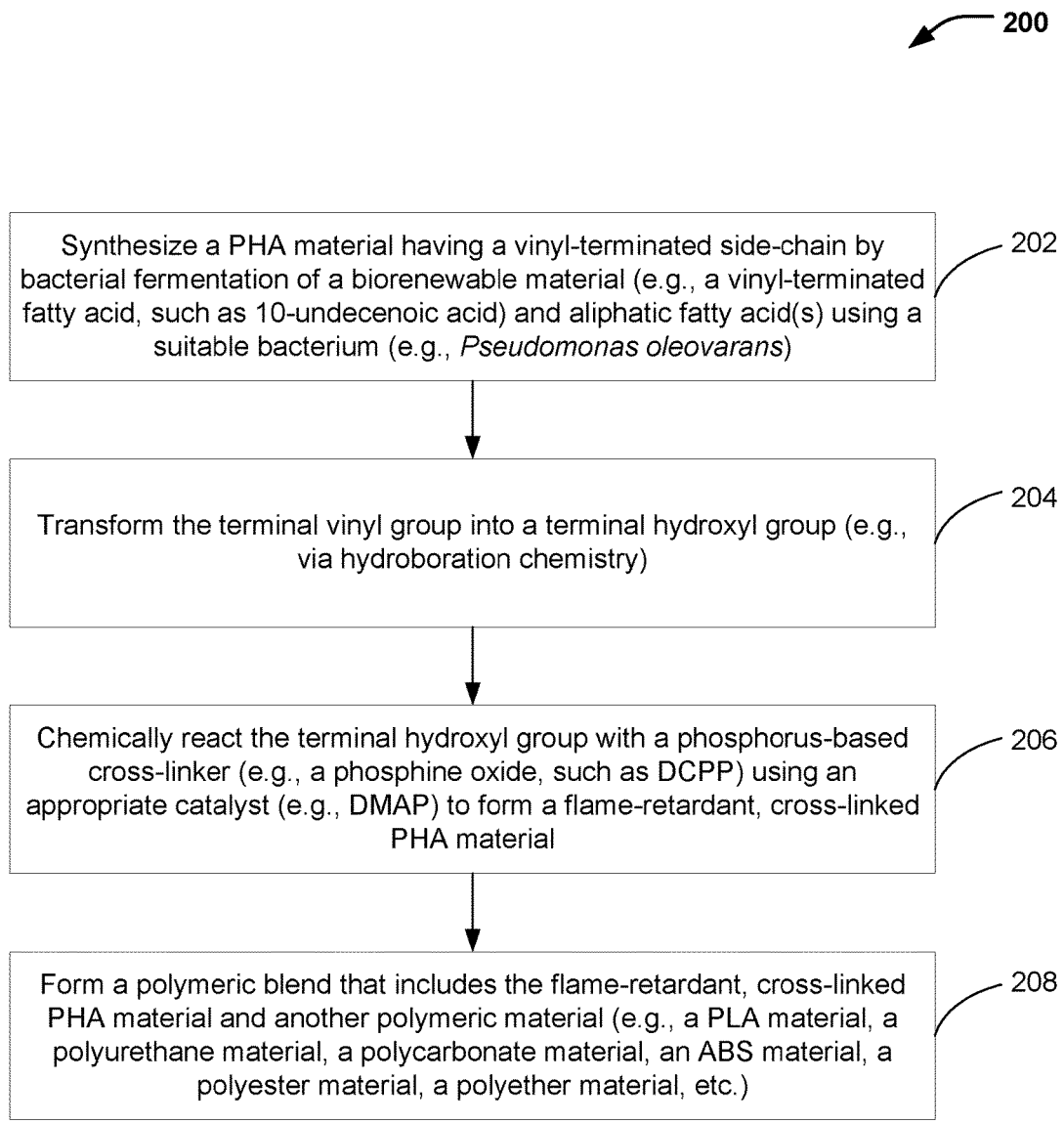

FIG. 1 is a chemical reaction diagram illustrating a process of forming a flame-retardant, cross-linked PHA material, according to one embodiment; and FIG. 2 is a flow diagram showing a particular embodiment of a process of forming a flame-retardant, cross-linked PHA material.

V. DETAILED DESCRIPTION

The present disclosure relates to flame-retardant (FR) cross-linked polyhydroxyalkanoate (PHA) materials and processes for forming FR cross-linked PHA materials. As used herein, the term "PHA material" is used to refer to a poly(3-hydroxyalkanoate) material, which is a group of storage polymers produced by many types of bacteria in response to growth restriction by a nutrient other than the carbon source. To illustrate, *Pseudomonas oleovorans* is an example of a microorganism that produces PHAs with relatively long pendant side-chains. The long side-chains may contain some functionalities, such as olefins, that may provide sites for chemical modifications. In the present disclosure, a phosphorus-based cross-linker material may be chemically reacted with terminal vinyl groups on the side-chains of PHAs to form flame-retardant, cross-linked PHA materials.

Referring to FIG. 1, a chemical reaction diagram 100 illustrates a particular embodiment of a process of forming a flame-retardant, cross-linked polyhydroxyalkanoate (PHA) material 130. The first chemical reaction depicted in FIG. 1 illustrates the formation of a PHA material 108 having a vinyl-terminated side-chain from a mixture of vinyl-terminated fatty acid(s) and aliphatic fatty acid(s) via a bacterial fermentation process. In the example of FIG. 1, the mixture includes a (single) biorenewable vinyl-terminated fatty acid 102, a first aliphatic fatty acid 104 (identified as "Aliphatic Fatty Acid(1)" in FIG. 1), and a second aliphatic fatty acid 106 (identified as "Aliphatic Fatty Acid (2)" in FIG. 1). In alternative embodiments, the mixture may include alternative and/or additional vinyl-terminated fatty acid(s), aliphatic fatty acid(s), or a combination thereof. The second chemical reaction depicted in FIG. 1 illustrates that a vinyl group of the vinyl-terminated side-chain of the PHA material 108 may be converted to a hydroxyl group, which may be chemically reacted with a phosphorus-based cross-linker 120 to form the flame-retardant, cross-linked PHA material 130.

In the particular embodiment illustrated in FIG. 1, the biorenewable vinyl-terminated fatty acid 102 includes 10-undecenoic acid. In some cases, the biorenewable vinyl-terminated fatty acid 102 (or multiple biorenewable vinyl-terminated fatty acids) may be formed from one or more biorenewable plant oils (e.g., castor oil in the case of 10-undecenoic acid). Other examples of biorenewable plant oils include vegetable oils, soybean oil, linseed oil, etc. Thus, while FIG. 1 illustrates one example of a single vinyl-terminated fatty acid, alternative and/or additional biorenewable vinyl-terminated fatty acid(s) of varying chain length may be used.

In the example of FIG. 1, two aliphatic fatty acids are illustrated on the left side of the first chemical reaction diagram, with the first aliphatic fatty acid 104 including a terminal "$R_1$" group and the second aliphatic fatty acid 106 including a terminal "$R_2$" group in order to distinguish the two aliphatic fatty acids. Illustrative, non-limiting examples of aliphatic fatty acids may include hexanoic acid, heptanoic acid, octanoic acid, nonanoic acid, decanoic acid, or undecanoic acid (among other alternatives). In a particular embodiment, at least one of the aliphatic fatty acids 104, 106 includes octanoic acid, and the biorenewable vinyl-terminated fatty acid 102 includes 10-undecenoic acid.

As described further herein, the bacterial fermentation process results in the PHA material 108 depicted on the right side of the first chemical reaction diagram. The PHA material 108 with the vinyl-terminated side-chain includes a first portion (x) corresponding to the biorenewable vinyl-terminated fatty acid 102, a second portion (y) corresponding to the first aliphatic fatty acid 104 (with the terminal $R_1$ group), and a third portion (z) corresponding to the second aliphatic fatty acid 106 (with the terminal $R_2$ group). As described further herein, the portions x, y, z may be adjusted by varying stoichiometric ratio(s), reaction condition(s), or a combination thereof.

A bacterial fermentation process may be used to form the PHA material 108 having the vinyl-terminated side-chain. In the example of FIG. 1, *pseudomonas oleovorans* is illustrated as a bacterium that may be used for the bacterial fermentation process. Other suitable bacteria may be utilized in other cases. To illustrate, *pseudomonas oleovorans* may be grown in the presence of the biorenewable vinyl-terminated fatty acid 102 (e.g., 10-undecenoic acid in the example of FIG. 1) and the aliphatic fatty acids 104 and 106, and the resulting polymer may be extracted from lyophilized cells using chloroform and precipitated with methanol.

In some cases, one or more properties of the PHA material 108 with the vinyl-terminated side-chain may be "tunable" via selection of biorenewable vinyl-terminated fatty acid(s) of varying chain length, aliphatic fatty acid(s) of varying chain length, aliphatic fatty acid(s) having internal vinyl group(s), or a combination thereof (among other alternatives). To illustrate, chain length(s), internal vinyl group(s), etc. may affect properties such as glass transition temperature, melting temperature, and/or various materials characteristics (e.g., impact resistance, compression properties, etc.). As an illustrative, non-limiting example, the $R_1$ group of the first aliphatic fatty acid 104 may represent a longer chain than the $R_2$ group of the second aliphatic fatty acid 106. In this example, the portion (y) of the PHA material 108 corresponding to the first aliphatic fatty acid 104 represents a "longer chain component," and the portion (z) of the PHA material 108 corresponding to the second aliphatic fatty acid 106 represents a "shorter chain component."

The second chemical reaction depicted in FIG. 1 illustrates an example in which a terminal vinyl group of the PHA material 108 may be converted to a terminal hydroxyl group, which may be chemically reacted with a phosphorus-based cross-linker 120 to form the flame-retardant, cross-linked PHA material 130. In alternative embodiments, the terminal vinyl group may be converted to a different reactive functionality that is suitable for chemical reaction with the phosphorus-based cross-linker 120.

In a particular embodiment (depicted as steps 1 and 2 in FIG. 1), the terminal vinyl group of the PHA material 108 may be converted to a terminal hydroxyl group via hydroboration chemistry. For example, hydroxylation of the PHA material 108 may be performed using borane or 9-borobicyclononane (9-BBN), which attaches only to the vinyl ends.

Prophetic Example: Hydroboration of Vinyl-Terminated Side-Chain

To a dried reaction vessel charged with "PHA," under an inert atmosphere (argon/nitrogen), a mixture of anhydrous chloroform/THF (e.g., a ratio of about 1:6 to give a PHA concentration of about 0.1 M, but this ratio could be flexible) may be added. The reaction may be cooled to about 0° C., and a solution of borane (or other applicable reagent such as 9-BBN, or disiamylborane ≥1 equivalents per vinyl group) in THF may be added, dropwise. The reaction mixture may be warmed to room temperature and stirred for about 12 hours at room temperature. The reaction mixture may then be cooled to about 10° C., and a solution of NaOH may be added (3.0 M, in excess), followed by an addition of hydrogen peroxide (30 weight percent, in excess). The reaction mixture may be cooled to about −25° C., and a small amount of methanol (approx. 3% by volume) may be added, and the reaction may be stirred for a minimum of 10 minutes. A solution of 3M NaOH, approx. 5% by volume (approx. 1.3 equivalents), may then be added to the reaction mixture and may be stirred for about 15 minutes. A solution of hydrogen peroxide may then be added (approx. 30% in water, 3.5-4.0 equivalents). The reaction may be stirred at about −25° C. for about 1 hour, followed by a slow warming to about 40° C. over a time period of about 1 hour, followed by cooling to room temperature. The resulting solution may be filtered, and 1M HCl may be added dropwise until the reaction mixture reaches a neutral pH. The solvents may be removed in vacuo until a small amount remains, and the crude reaction mixture may be extracted with DMF, filtered, and the solvent removed in vacuo.

In a particular embodiment (depicted as step 3 in FIG. 1), the terminal hydroxyl group may be reacted with the phosphorus-based cross-linker 120 in solution or under melt conditions using an appropriate catalyst, such as dimethylaminopyridine (DMAP). In the particular embodiment illustrated in FIG. 1, the phosphorus-based cross-linker 120 is a phosphine oxide, such as dichlorophenylphosphine oxide (identified as "DCPP" in FIG. 1). In some cases, alternative and/or additional phosphorus-based cross-linking materials may be utilized. As an illustrative, non-limiting example, phenylphosphonic acid (or a combination of dichlorophenylphosphine oxide and phenylphosphonic acid) may be used as the phosphorus-based cross-linker 120.

The right side of the second chemical reaction diagram of FIG. 1 illustrates that a hydroxyl group of a hydroxyl-terminated side-chain of a first PHA material chemically reacts with a first chloride group of the phosphorus-based cross-linker 120, and a hydroxyl group of a hydroxyl-terminated side-chain of a second PHA material chemically reacts with a second chloride group of the phosphorus-based cross-linker 120. The chemical reaction of the two hydroxyl groups with the two chloride groups results in the formation of the flame-retardant cross-linked PHA material 130 having a first PHA material that is cross-linked to a second PHA material via the phosphorus-based cross-linker 120.

Prophetic Example: Formation of FR Cross-Linked PHA Material

Hydroxyl-functionalized PHA and a catalytic (approx. 5%) amount of 4-(dimethylaminopyridine) (DMAP) may be added to a dried reaction vessel under inert atmosphere. The two compounds may be dissolved in an organic solvent such as chloroform, THF, toluene, chlorobenzene etc., and the reaction may be carried out at or above room temperature, under reflux conditions. DCPP may be added dropwise to the reaction mixture while stirring. The reaction generates HCl gas which may be scavenged by venting to a vessel containing a basic, aqueous solution. The reaction may also be exposed to a reduced pressure to further drive off HCl gas and promote the reaction of DCPP with the hydroxyl groups. Upon completion, the reaction may be cooled to room temperature, and the crude product may be dissolved in an organic solvent such as chloroform, THF, toluene, chlorobenzene etc., if no solvent was used to conduct the reaction. The polymer may be precipitated by pouring the solution into an organic non-polar solvent such as hexane, methanol, ethanol, acetone, etc. Any resulting solids may be filtered and purified further by techniques known to those skilled in the arts, such as Soxhlet extraction.

While FIG. 1 illustrates the chemical reaction of the terminal hydroxyl groups on the side-chains of the PHA materials, the condensation reaction may also react with the hydroxyl end group of the polymer main chain and may even link polymer chains together in this fashion. Reaction of the hydroxyl end groups may be reduced/avoided as a result of the difference in reactivity of the hydroxyl groups on the side-chains compared to the hydroxyl groups at the terminus of the polymer. The terminal, end group hydroxyls are secondary hydroxyls, which have a lower reactivity towards phosphate or phosphonate condensation reactions relative to the primary hydroxyl groups on the polymer side-chains. Controlling the temperature during the cross-linking reaction (e.g., maintaining a temperature below 100° C.) may enable activation of the cross-linking reaction at the primary, side-chain hydroxyl groups to a significant extent.

In some cases, the mechanical properties of the flame-retardant, cross-linked PHA material 130 may be "tuned" by varying the chain length of the aliphatic fatty acid(s) used to form the PHA material 108 with the vinyl-terminated side-chain, or by varying the length of the PHA material 108, which can be achieved by modifying reaction conditions, such as time, temperature, and the bacterium that is selected for fermentation. The mechanical properties may also be affected by the amount of cross-linking that occurs, which can be controlled by the ratio of the initial blend/feed of vinyl-functionalized fatty acid(s) to aliphatic fatty acid(s). In a particular embodiment, the flame-retardant, cross-linked PHA material 130 of FIG. 1 may be mixed with a second polymeric material (or multiple polymeric materials) to form a polymeric blend. In some cases, the second polymeric material may include a polylactic acid (PLA) material, a polyurethane material, a polycarbonate material, an acrylonitrile butadiene styrene (ABS) material, a polyester material, a polyether material, or a combination thereof.

Thus, FIG. 1 illustrates an example of a process of forming a PHA material that is cross-linked using a phosphorus-based cross-linker to impart flame retardancy characteristics. Biorenewable materials may be used to form the PHA materials for cross-linking, and the cross-linked PHA materials (or blends that include the cross-linked PHA materials) may be used in various applications in order to increase a biorenewable content.

Referring to FIG. 2, a flow diagram illustrates a process 200 of forming a flame-retardant, cross-linked PHA material, according to a particular embodiment. In the particular embodiment illustrated in FIG. 2, the process 200 includes utilizing the flame-retardant, cross-linked PHA material as a component of a polymeric blend. In other cases, the flame-retardant, cross-linked PHA material may be used as a standalone polymeric material.

In the particular embodiment illustrated in FIG. 2, operations associated with an example process of producing a flame-retardant, cross-linked PHA material are identified as operations 202-206. It will be appreciated that the operations shown in FIG. 2 are for illustrative purposes only and that the chemical reactions may be performed in alternative orders, at alternative times, by a single entity or by multiple entities, or a combination thereof. As an example, one entity may produce biorenewable vinyl-terminated fatty acid(s), another entity may produce PHA material(s) with vinyl-terminated side-chain(s), while another entity may produce flame-retardant, cross-linked PHA material(s). Further, alternative or additional entities may perform operations associated with forming a polymeric blend that includes the flame-retardant, cross-linked PHA material and another polymeric material (illustrated as operation 208).

The process 200 includes synthesizing a PHA material having a vinyl-terminated side-chain by bacterial fermentation of a biorenewable material and aliphatic fatty acid(s) using a suitable bacterium, at 202. For example, referring to FIG. 1, the left side of the first chemical reaction illustrates a mixture that includes the biorenewable vinyl-terminated fatty acid 102, the first aliphatic fatty acid 104, and the second aliphatic fatty acid 106. The right side of the first chemical reaction diagram of FIG. 1 illustrates that a bacterial fermentation process (e.g., using *pseudomonas oleovarans* bacteria) results in the formation of the PHA material 108 having the vinyl-terminated side-chain.

The process 200 includes transforming the terminal vinyl group into a terminal hydroxyl group, at 204. For example, referring to the second chemical reaction of FIG. 1, hydroboration chemistry may be used to convert a terminal vinyl group of the PHA material 108 to a terminal hydroxyl group.

The process 200 includes chemically reacting the terminal hydroxyl group with a phosphorus-based cross-linker to form a flame-retardant, cross-linked PHA material, at 206. In some cases, the terminal hydroxyl group may be chemically reacted with the phosphorus-based cross-linker in the presence of a suitable catalyst (e.g., DMAP). For example, referring to the second chemical reaction diagram of FIG. 1, a terminal hydroxyl group of a side-chain of one PHA material chemically reacts with a first functional group of the phosphorus-based cross-linker 120 (e.g., a first chloride group of DCPP), and terminal hydroxyl group of a side-chain of another PHA material chemically reacts with a second functional group of the phosphorus-based cross-linker 120 (e.g., a second chloride group of DCPP). The right side of the second chemical reaction diagram of FIG. 1 illustrates that the chemical reactions of the terminal hydroxyl groups results in the formation of the flame-retardant, cross-linked PHA material 120.

In the particular embodiment illustrated in FIG. 2, the process 200 further includes forming a polymeric blend that includes a first polymeric material and the flame-retardant, cross-linked PHA material, at 208. For example, the first polymeric material may include a PLA material, a polyurethane material, a polycarbonate material, an ABS material, a polyester material, a polyether material, or a combination thereof.

Thus, FIG. 2 illustrates an example of a process of forming a flame-retardant, cross-linked PHA material. In the example of FIG. 2, the addition of the flame-retardant, cross-linked PHA material of the present disclosure may be used to increase a biorenewability content of a polymeric material for use in various applications. In other cases, the flame-retardant, cross-linked PHA material of the present disclosure may be used as a standalone polymeric material.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process comprising:
   forming a mixture that includes a biorenewable vinyl-terminated fatty acid and at least one aliphatic fatty acid;
   forming a polyhydroxyalkanoate (PHA) material having a vinyl-terminated side-chain from the mixture via a bacterial fermentation process;
   converting a vinyl group of the vinyl-terminated side-chain to a hydroxyl group; and
   chemically reacting the hydroxyl group with a phosphorus-based cross-linker to form a flame-retardant, cross-linked PHA material.

2. The process of claim 1, wherein the biorenewable vinyl-terminated fatty acid is formed from a biorenewable plant oil.

3. The process of claim 2, wherein the biorenewable plant oil includes castor oil, linseed oil, soybean oil, or a combination thereof.

4. The process of claim 1, wherein the biorenewable vinyl-terminated fatty acid includes 10-undecenoic acid.

5. The process of claim 1, wherein the phosphorus-based cross-linker includes a phosphine oxide.

6. The process of claim 5, wherein the phosphorus-based cross-linker includes dichlorophenylphosphine oxide.

7. The process of claim 1, wherein the hydroxyl group is chemically reacted with the phosphorus-based cross-linker in the presence of a catalyst.

8. The process of claim 7, wherein the catalyst includes dimethylaminopyridine (DMAP).

9. The process of claim 1, wherein the vinyl group is converted to the hydroxyl group via hydroboration chemistry.

10. The process of claim 1, further comprising forming a polymeric blend that includes the flame-retardant, cross-linked PHA material and a second polymeric material.

11. The process of claim 10, wherein the second polymeric material includes a polylactic acid (PLA) material, a polyurethane material, a polycarbonate material, an acrylonitrile butadiene styrene (ABS) material, a polyester material, a polyether material, or a combination thereof.

12. A flame-retardant, cross-linked polyhydroxyalkanoate (PHA) material formed by a process comprising:
   forming a mixture that includes a biorenewable vinyl-terminated fatty acid and at least one aliphatic fatty acid;
   forming a polyhydroxyalkanoate (PHA) material having a vinyl-terminated side-chain from the mixture via a bacterial fermentation process;
   converting a vinyl group of the vinyl-terminated side-chain to a hydroxyl group; and
   chemically reacting the hydroxyl group with a phosphorus-based cross-linker to form a flame-retardant, cross-linked PHA material.

13. The flame-retardant, cross-linked PHA material of claim 12, wherein the biorenewable vinyl-terminated fatty acid includes 10-undecenoic acid.

14. The flame-retardant, cross-linked PHA material of claim 12, wherein the phosphorus-based cross-linker includes a phosphine oxide.

15. A flame-retardant, cross-linked polyhydroxyalkanoate (PHA) material comprising a first PHA material that is cross-linked to a second PHA material via a phosphorus-based cross-linker, wherein the first PHA material and the second PHA material are formed from a mixture of a biorenewable vinyl-terminated fatty acid and at least one aliphatic fatty acid via a bacterial fermentation process.

16. The flame-retardant, cross-linked PHA material of claim 15, wherein the first PHA material and the second PHA material are formed from biorenewable materials.

17. The flame-retardant, cross-linked PHA material of claim 15, wherein the biorenewable vinyl-terminated fatty acid includes 10-undecenoic acid.

18. A polymeric blend that includes the flame-retardant, cross-linked PHA material of claim 15 and a second polymeric material.

19. The polymeric blend of claim 18, wherein the second polymeric material includes a polylactic acid (PLA) material, a polyurethane material, a polycarbonate material, an acrylonitrile butadiene styrene (ABS) material, a polyester material, a polyether material, or a combination thereof.

* * * * *